United States Patent
Baroggi et al.

(10) Patent No.: US 8,328,273 B2
(45) Date of Patent: Dec. 11, 2012

(54) VEHICLE COMPRISING A PANE BONDED TO THE BODYWORK

(75) Inventors: Jean-Louis Baroggi, Marcoussis (FR); Marc Capdepuy, Seilh (FR); Regis Dornez, Montigny le Bretonneux (FR); Laurent Miro, Grisolles (FR); Charles Zhang, Guyancourt (FR)

(73) Assignees: Renault S.A.S., Boulogne Billancourt (FR); S.A. Artec Aerospace, Seilh (FR)

( * ) Notice: Subject to any disclaimer, the term of this patent is extended or adjusted under 35 U.S.C. 154(b) by 0 days.

(21) Appl. No.: 13/197,407

(22) Filed: Aug. 3, 2011

(65) Prior Publication Data

US 2012/0133179 A1    May 31, 2012

Related U.S. Application Data

(63) Continuation of application No. 12/972,136, filed on Dec. 17, 2010, now abandoned, which is a continuation of application No. 12/774,124, filed on May 5, 2010, now abandoned, which is a continuation of application No. 12/567,967, filed on Sep. 28, 2009, now abandoned, which is a continuation of application No. 11/719,446, filed as application No. PCT/FR2005/050955 on Nov. 16, 2005, now abandoned.

(30) Foreign Application Priority Data

Nov. 16, 2004 (FR) .................................. 04 12121

(51) Int. Cl.
*B60J 1/00* (2006.01)
(52) U.S. Cl. ................. 296/201; 296/146.15; 296/96.21
(58) Field of Classification Search ................. 296/84.1, 296/96.21, 146.15, 201
See application file for complete search history.

(56) References Cited

U.S. PATENT DOCUMENTS

| | | | |
|---|---|---|---|
| 4,857,376 A | | 8/1989 | Reis et al. |
| 5,593,784 A | | 1/1997 | Chinzi |
| 6,406,782 B2 * | | 6/2002 | Johnson et al. ............. 428/317.7 |
| 6,851,737 B2 * | | 2/2005 | Okamoto et al. ............ 296/84.1 |
| 7,344,772 B2 * | | 3/2008 | Rehfeld et al. ............. 428/304.4 |
| 8,132,386 B2 * | | 3/2012 | Leconte .................... 52/717.01 |
| 2001/0047058 A1 | | 11/2001 | Johnson et al. |
| 2004/0035066 A1 | | 2/2004 | Leconte |
| 2006/0008625 A1 * | | 1/2006 | Recker et al. .............. 428/195.1 |

FOREIGN PATENT DOCUMENTS

| | | |
|---|---|---|
| CA | 2 008 787 | 3/2002 |
| DE | 35 01 916 | 7/1986 |
| JP | 2004 299572 | 10/2004 |
| WO | WO2004/012952 | * 2/2004 |

* cited by examiner

*Primary Examiner* — Dennis Pedder
(74) *Attorney, Agent, or Firm* — Oblon, Spivak, McClelland, Maier & Neustadt, L.L.P.

(57) ABSTRACT

A vehicle including at least one glass pane, bodywork, and at least one layer of viscoelastic material interposed between the glass pane and the bodywork.

9 Claims, 6 Drawing Sheets

VEHICLE COMPRISING A PANE BONDED TO THE BODYWORK

CROSS-REFERENCE TO RELATED APPLICATIONS

The present application is a continuation of U.S. application Ser. No. 12/972,136, filed Dec. 17, 2010, which is a continuation of U.S. application Ser. No. 12/774,124, filed May 5, 2010, which claims the benefit of priority from U.S. application Ser. No. 12/567,967, filed Sep. 28, 2009, the entire contents of which is incorporated herein by reference. U.S. Ser. No. 12/567,967 is a continuation of U.S. application Ser. No. 11/719,446, filed May 16, 2007, which is a National Stage of PCT/FR05/50955, filed Nov. 16, 2005, and in turn claims priority to FR 04 12121, filed on Nov. 16, 2004.

BACKGROUND

The invention relates to vehicles comprising at least one glass pane and bodywork.

Under the effect of excitations generated by the engine and the contact of the tires with the carriageway, the windshield and the rear window of an automotive vehicle may become significant noise transmitters below a frequency of 800 Hz. Generally, when a windshield is vibrated by its mechanical supports or by an incident acoustic wave, it generates pressure waves that are transmitted through the passenger compartment to the detriment of the comfort of the passengers.

In order to improve the acoustic performance of automotive vehicles, the reduction of the vibrational level of these two panels, amongst other things, is the subject of many studies. Currently, two types of solutions are adopted.

The first consists in strengthening the body structure in order to decrease the propagation of the vibrational energy toward these panels. The effectiveness of this solution is limited by architectural constraints. This solution also results in an increase in the weight and cost of the body.

Another solution consists of a damping material of polyvinyl butyral (PVB) type. Indeed, windshields are known today that are made from this material, which was developed to shift the glass transition temperature toward 15° C. With this characteristic, the windshield has a high damping factor at room temperature. On the other hand, this solution has two drawbacks. On the one hand, its vibration-attenuating effect only becomes significant above 150 Hz, as below this frequency the deformation of the windshield prevents the PVB from working further. On the other hand, it represents a significant overcost (more than 10€) relative to a conventional windshield.

BRIEF SUMMARY

One objective of the invention is to improve the comfort of the vehicle occupants.

With a view to achieving this objective, a vehicle is provided according to the invention that comprises at least one glass pane and bodywork, and at least one layer of viscoelastic material interposed between the glass pane and the bodywork.

Thus, when an incident wave or an excitation generates a vibration of the windshield, this vibration is transmitted to the viscoelastic material which converts some of this wave into mechanical strain energy and into heat energy. The vibration of the windshield is therefore greatly attenuated, which improves the comfort of the passengers.

The vehicle according to the invention could have, in addition, at least one of the following features:
the viscoelastic material extends continuously along at least one side of one perimeter of the glass pane;
the viscoelastic material extends discontinuously along at least one side of one perimeter of the glass pane;
the glass pane has a perimeter of which at least one side is free from viscoelastic material;
it comprises, in addition, at least one layer of adhesive interposed between the glass pane and the bodywork;
it comprises at least one area in which the layer of adhesive and the layer of viscoelastic material are superposed;
it comprises at least one area in which the layer of adhesive and the layer of viscoelastic material are superposed, this area comprising, in addition, a layer of adhesive or of viscoelastic material juxtaposed with the superposed layers;
it comprises a film interposed between the superposed layers;
it comprises at least one area in which the layer of viscoelastic material and a layer of adhesive are juxtaposed; and
the viscoelastic material has the following characteristics:
a loss factor greater than or equal to 0.7; and
a elastic shear modulus less than or equal to 3 MPa,
in a temperature range from 10 to 40° C. and under a vibrational excitation between 20 and 500 Hz.

Also provided according to the invention is a process for attaching at least one glass pane to vehicle bodywork, in which one layer of viscoelastic material is interposed between the glass pane and the bodywork.

BRIEF DESCRIPTION OF THE DRAWINGS

Other features and advantages of the invention will become more apparent on reading the following several embodiments given by way of nonlimiting examples, with reference to the appended drawings in which.

DETAILED DESCRIPTION

Figure 1:
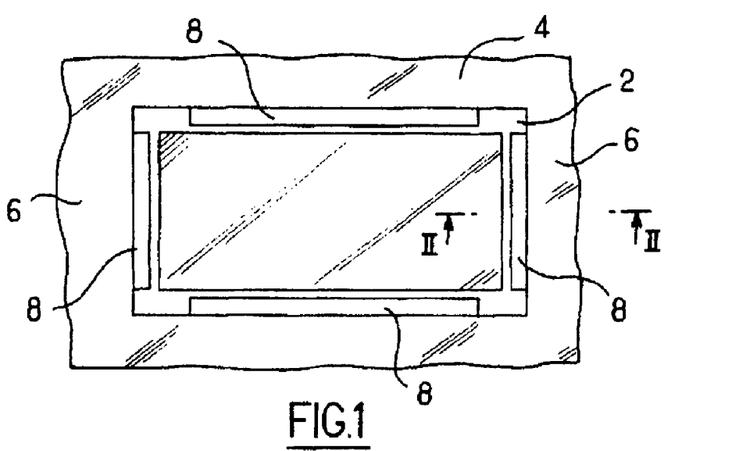
FIG. 1 is a plan view of a vehicle according to a first embodiment of the invention, at the level of the windshield and its attachment to the bodywork.
Figure 2:
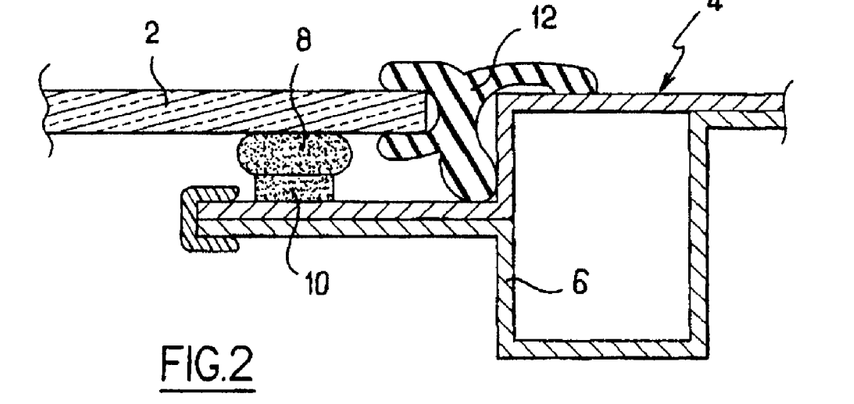
FIG. 2 is a cross-sectional view of the vehicle from FIG. 1 along the plane II-II.

A first embodiment of the vehicle according to the invention is illustrated in FIGS. 1 and 2. The vehicle comprises several glass panes among which is a windshield 2. The invention will be described in relation to the windshield in the embodiments below. Nevertheless, it is clearly understood that the invention could be used with other glass panes such as the rear window.

The vehicle comprises a bodywork 4 comprising, in particular, two struts 6 made of metal or of plastic to which the windshield 2 is attached. For this purpose, a layer of standard adhesive 8 such as an adhesive known as HV3 and sold under the brand GURITE is provided, which conventionally ensures bonding of the windshield to the body. The transverse section of the layer 8 has, for example, a thickness of 4 mm and a width of 6 mm and its elastic modulus is between 30 and 50 MPa.

The arrangement also comprises a layer of an elastic or viscoelastic material 10. This layer has, in this particular case, a thickness of 1 to 2 mm. The term "viscoelastic material" is understood to mean a material whose elastic modulus is between 1 and 3 MPa and whose loss factor is greater than 0.7, for example around 10. A material such as butyl rubber could be chosen. The layers 8 and 10 are superposed here and form, with the windshield 2 and the two sheet layers forming the bodywork, a multilayer of five layers as illustrated in FIG. 2. Specifically, the upper face of the adhesive layer 8 spreads out in contact with the lower face of the windshield 2. The lower face of the adhesive layer 8 spreads out in contact with the upper face of the layer 10 of viscoelastic material. The latter spreads out in contact, via its lower face, with the bodywork 4. A lip seal 12 is provided that covers on the one hand the edge of the windshield 2, which otherwise would extend toward the bodywork, and on the other hand the edge of the windshield strut.

As can be seen in FIG. 1, the assembly formed by superposing the two layers forms four portions corresponding respectively to the four sides of the perimeter of the windshield 2. For each side, the corresponding portion extends continuously over a larger part of this side, in its central area.

In this arrangement, the adhesive 8 ensures bonding of the windshield to the body while the layer of viscoelastic material 10 makes it possible to dissipate the energy transmitted between the body and the windshield. In order to dissipate the maximum amount of energy, the ratio of the elastic moduli between the adhesive and the viscoelastic material will preferably be greater than 5. In the embodiments described, it is the shear loss factor which is to be considered. This variation in the stiffness makes it possible to transmit energy to the layer of viscoelastic material and make the latter work, especially in shear. Another factor which may be important is the discontinuity of the placement of the viscoelastic material around the windshield insofar as the aforementioned portions are not in contact with one another. Indeed, this discontinuity may artificially create local deformations that amplify the dissipation effect of the material.

Figure 3:
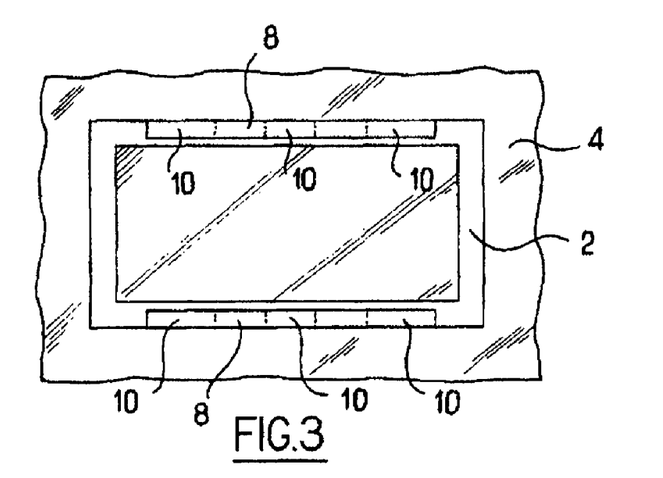
FIGS. 3 and 4 are similar views to FIG. 1 illustrating other embodiments.

This effect could be accentuated by providing, as a variant, as in FIG. 3, in which each portion is formed from a continuous adhesive layer 8 covering the discontinuous sections of the viscoelastic material layer. The viscoelastic material layer 10 is therefore discontinuous this time. In the embodiment in FIG. 3 the windshield 2 is attached to the bodywork only by its upper and lower longitudinal sides by means of this arrangement.

Figures 4, 5, 6, 7, 8:
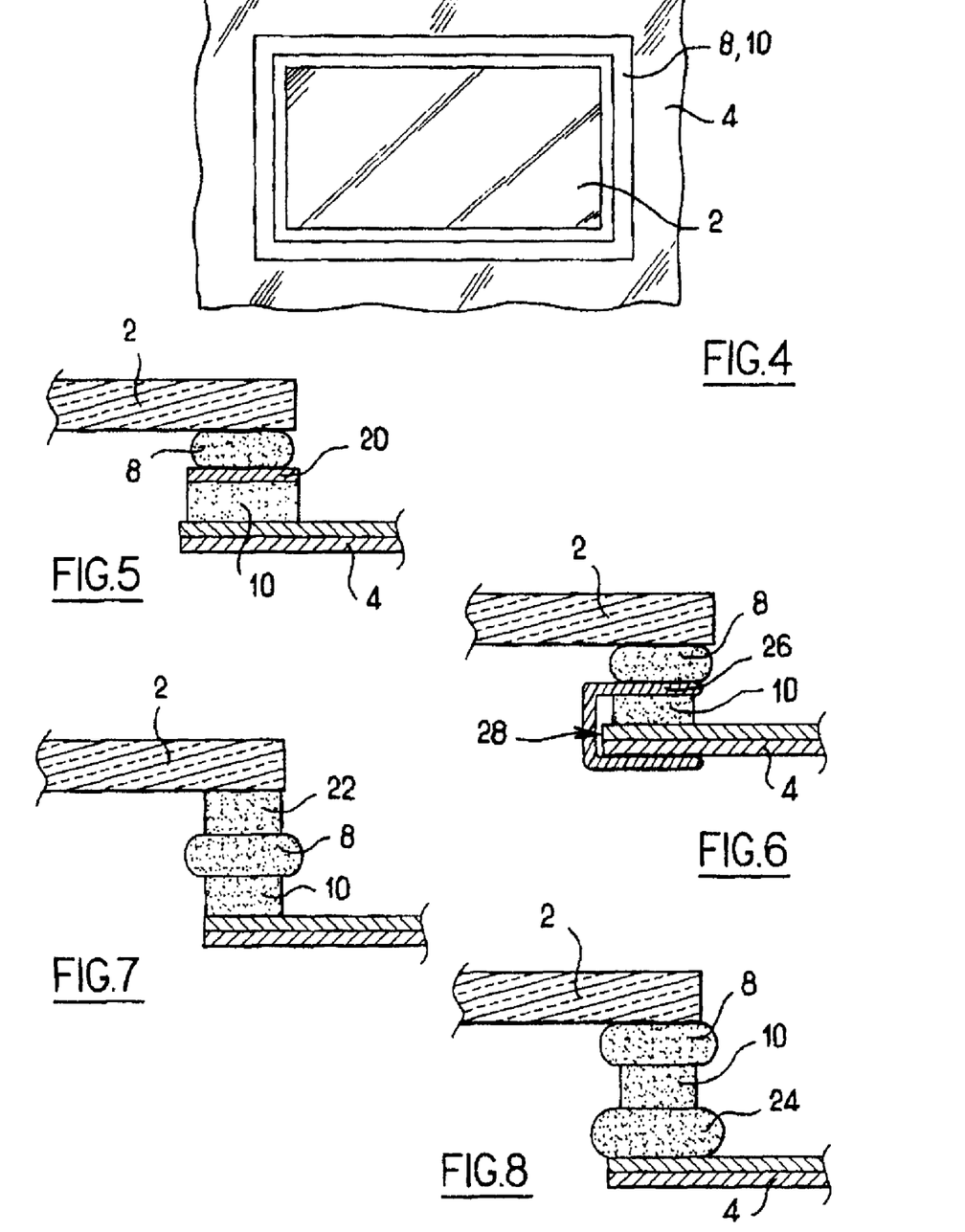
FIGS. 5 to 8 are similar views to FIG. 2 illustrating other embodiments.

With reference to FIG. 4, it could be planned, in another embodiment, that the superposition of the two layers 8 and 10 takes place over the entire perimeter of the windshield to form a continuous double-thickness bead. This arrangement has the advantage of improving the sealing between the windshield and the bodywork and makes it possible, optionally, to dispense with a seal specifically for that purpose.

In another embodiment illustrated in FIG. 5, a film or a foil, made of plastic or of metal for example is interposed between the layers 8 and 10. This film 20 has the role of strengthening the adhesion between the layers 8 and 10 and of amplifying the shear of the viscoelastic material 10.

In the arrangement provided in FIG. 6, by way of foil 20, a clip or clamp 26 is used of which one part extends between the layers 8 and 10 and which covers the edge 28 of the parts forming the bodywork in order to be attached via its side opposite to one face of these parts that is opposite to the layer 10.

As the embodiments in FIGS. 7 and 8 show, it is also possible to envisage increasing the number of superposed layers. Thus, in the embodiment in FIG. 7, an additional layer of viscoelastic material 22 is interposed between the upper face of the adhesive layer 8 and the lower face of the windshield. The adhesive layer 8 is therefore interposed between two viscoelastic material layers. Conversely, in the embodiment provided in FIG. 8, it is an additional layer of adhesive 24 that is provided between the lower face of the viscoelastic material layer 10 and the bodywork, so that the viscoelastic material layer 10 is interposed this time between two adhesive layers. Further increasing the number of superposed layers could also be anticipated.

Figure 9:
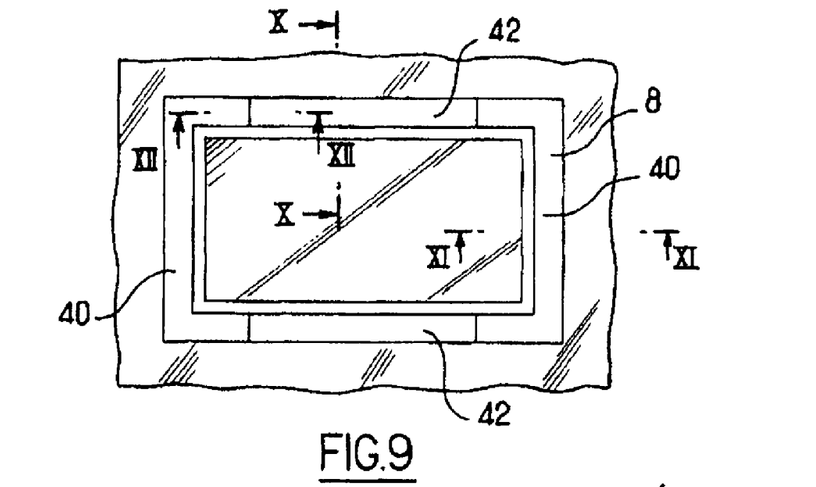
FIG. 9 is a similar view to FIG. 1 illustrating another embodiment.
Figure 10:
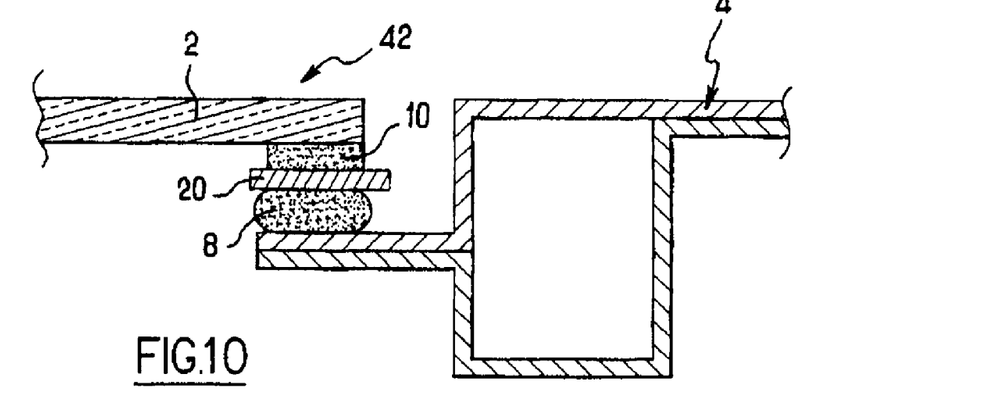
FIGS. 10 to 12 are cross-sectional views of the vehicle from FIG. 9 along the planes X-X to XII-XII respectively.
Figure 11:
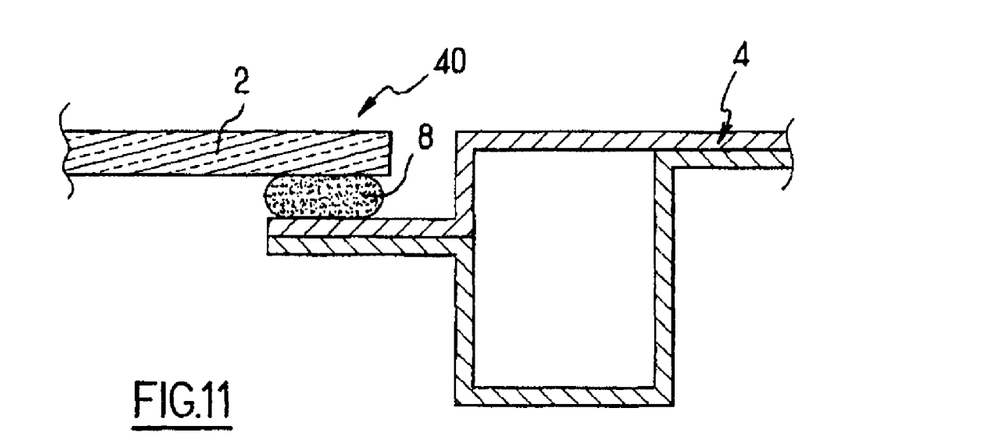

In the embodiment in FIG. 9, the attachment of the windshield 2 to the bodywork 4 is carried out in two different ways corresponding respectively to the areas 40 and 42. The first areas 40 correspond approximately in the present example to the left and right lateral sides of the windshield while slightly covering the lower and upper longitudinal sides. The second areas 42 correspond in the most part to the upper and lower sides. The structure of the areas 40 is illustrated in cross section in FIG. 11. In these areas, the windshield is attached to the bodywork by means of the single adhesive layer 8 which is therefore in direct contact with the lower face of the windshield and the bodywork. In the second areas 42, as illustrated in FIG. 10, the windshield is attached to the bodywork by means of an arrangement similar to that already described with reference to FIG. 5 although the viscoelastic material is this time located above the adhesive 8.

Again, the viscoelastic material makes it possible to absorb the vibrational energy transmitted between the bodywork and the windshield to ensure a good antinoise performance. Nevertheless, as good quality bonding of the glass pane to the bodywork is not necessarily ensured, especially due to the lack of flatness of the rebates supporting the windshield, it is preferable to superpose it, in addition, on conventional adhesive, optionally under a smaller thickness than normal. The separating foil ensures sufficient adhesion at the interface between the viscoelastic material and this adhesive. In the case where the viscoelastic material is compatible with suitable adhesion at the interface, this separating foil will not be necessary. In the areas 42, the adhesive has, in particular, the role of making up for the geometrical irregularities of the bodywork to ensure bonding and sealing that conform to the recommendations. In order to absorb the maximum amount of vibrational energy transmitted between the bodywork and the windshield, it will be preferable for the viscoelastic material to have a large loss factor and a low shear modulus in the frequency band concerned. It is possible to use the following values as reference values:

temperature range: from 10° C. to 40° C.;
    frequency: from 20 to 500 Hz
    loss factor: greater than 0.7; and
    elastic shear modulus: less than 3 MPa ($10^6$ N/m$^2$).

By way of example, acrylic foams are materials that can meet these requirements.

Besides the acoustic performance, the viscoelastic material must meet the mechanical strength criterion in case of impact. It is known, especially in the case of a frontal impact, that the driver and passenger airbags are deployed and exert a large force on the bottom of the windshield. In order to ensure the mechanical strength of the windshield in case of impact the viscoelastic material will preferably have to meet the specifications for the breaking stress being greater than 3 MPa. Indeed, the deployment time of an airbag is of the order of a few tenths of a second with a deformation of the elastic material of around a millimeter. The speed of the impact is therefore equivalent to a vibrational frequency greater than 1000 Hz. Thanks to its high viscosity, the viscoelastic material has a very high resistance to rapid deformation. For example, for the material sold under the name SCOTCH-DAMP SJ-2001 5X Viscoelastic Polymer, at 20° C., the modulus is 20 MPa and it is greater than 5 MPa at 1000 Hz. Consequently, this type of material meets both the vibrational demands and those of passive security.

Figure 12:
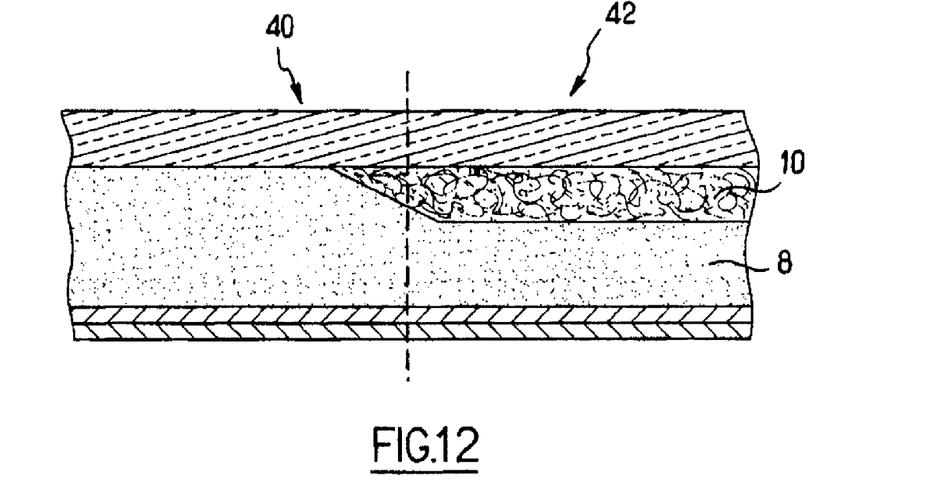

To ensure suitable sealing of the windshield, it will be preferable to avoid a sudden discontinuity at the junctions between the areas 40 and 42. It is therefore possible to produce a junction as illustrated in FIG. 12. From this it can be seen that the thickness of the adhesive layer 8 gradually increases as the thickness of the viscoelastic material layer 10 decreases and this following a linear progression to the boundary between the areas 40 and 42.

It will be possible to provide that the pressing device used for positioning the viscoelastic material shapes the product so that its end has a tapered shape approaching that of FIG. 12. However, in the case where this tapering of the material will not be sufficient, it will be possible to provide an excess of adhesive at the joining point with the other material. This excess will possibly be attained by slowing down the device for depositing the adhesive which will deposit therein an increased amount in order to guarantee sealing in this fragile area. In the embodiment in FIG. 12, it could be provided that the adhesive is of the type DOW HV3.

Figure 14:
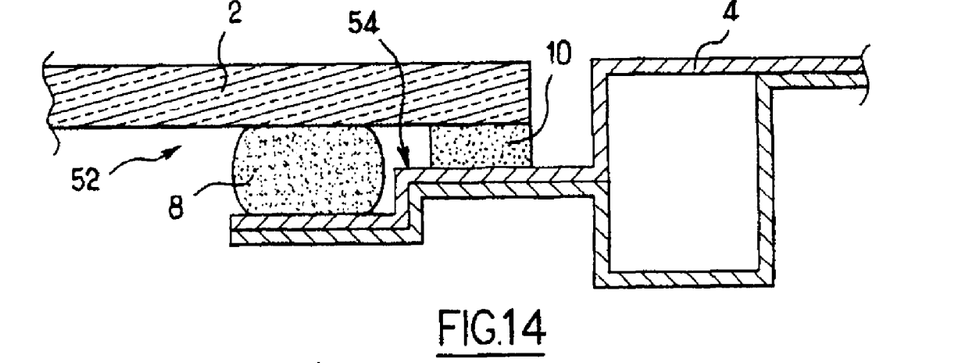
Figure 15:
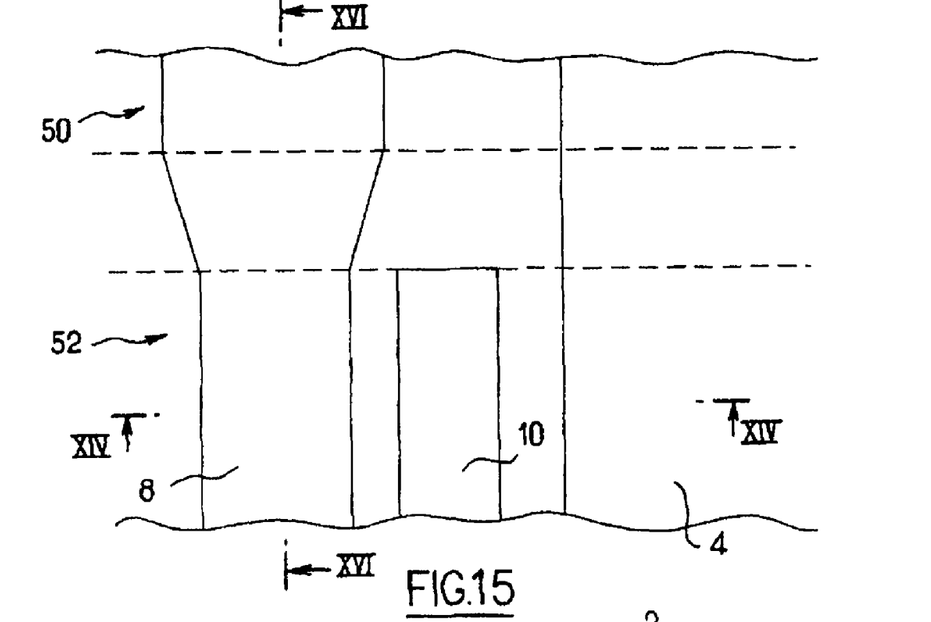
FIG. 15 is a plan view of the embodiment illustrated in FIG. 14 which constitutes a cross section along the plane XIV-XIV of the arrangement from FIG. 15.
Figure 16:
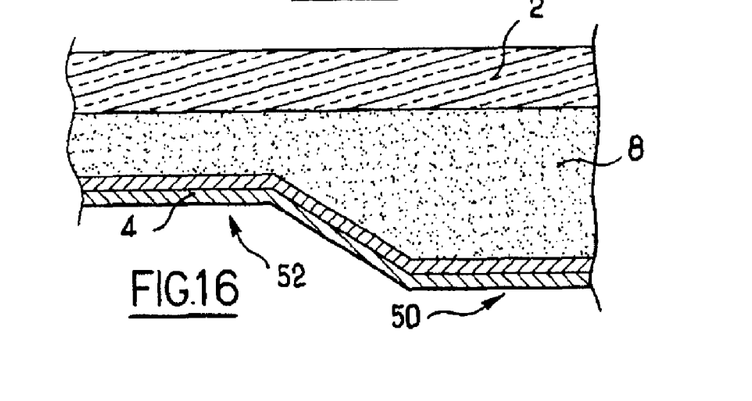
FIG. 16 is a cross-sectional view of the embodiment from FIG. 15 along the plane XVI-XVI.

Another embodiment has been described in FIGS. 14 to 16. This time, in certain areas 52 (for example, corresponding to areas 42), the windshield 2 is attached to the bodywork 4 by means of the adhesive 8 and the viscoelastic material 10 while, in the other areas 50 it is attached thereto only by means of the adhesive. Contrary to the embodiment in FIG. 9, in the areas 52, the two layers 8 and 10 are this time juxtaposed and at a distance from one another. They are placed one by the side of the other each in contact with the lower face of the windshield. They are moreover each in contact with the bodywork, a shoulder 54 possibly being provided at the rebate for taking into account the fact that the thickness of the viscoelastic material layer 10 is less than the thickness of the adhesive layer 8. This solution makes it possible to produce a continuous loop of adhesive over the entire periphery of the windshield. As the shear modulus of the adhesive is higher than that of the viscoelastic material, it is preferable to increase the thickness of the adhesive layer and to decrease the width thereof in the areas 52 in comparison to the areas 50 in order to maintain the effectiveness of the viscoelastic material. The thicknesses and widths of the layers of adhesive and of viscoelastic material are determined by calculations that enable the shear strain energy of the viscoelastic material to be maximized. Thus, in the or each area 52, the bonding line is narrower and thicker. The robot that carries out bonding of the windshield in the assembly line may therefore keep the same speed and the same adhesive delivery flow rate, which simplifies the assembly process.

In another embodiment, the seal 12 of FIG. 2 could be replaced with a seal that makes it possible to seal between the windshield and the bodywork regardless of the arrangement adopted for the adhesive and viscoelastic material layers. Such an arrangement makes it possible not only to simplify the junction between the two areas 50 and 52 but also to leave more freedom for optimizing the damping device and improving its performance.

Figure 17:
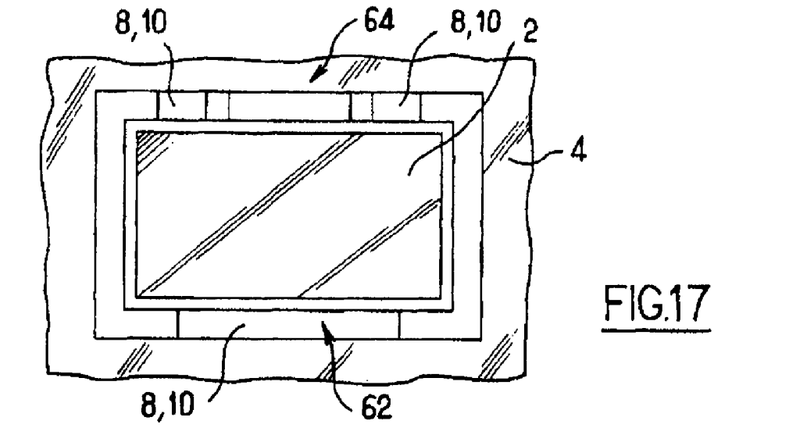
FIGS. 17 to 19 illustrate other embodiments.
Figure 18:
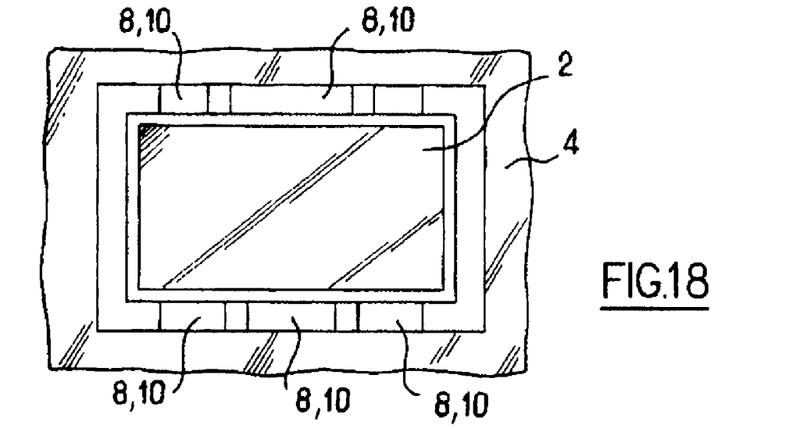

For example, it will be possible to provide embodiments such as those illustrated in FIGS. 17 and 18. In FIG. 17, the lower longitudinal side of the windshield is made up of an area 62 in which the layers are continuous and have the arrangement from FIG. 5 whereas they are discontinuous along the upper longitudinal edge 64 of the windshield with the same arrangement. The left and right lateral sides of the windshield are free of layers.

In the embodiment from FIG. 18, it is the two upper and lower longitudinal sides of the windshield that are provided with a double discontinuous layer.

Figure 19:
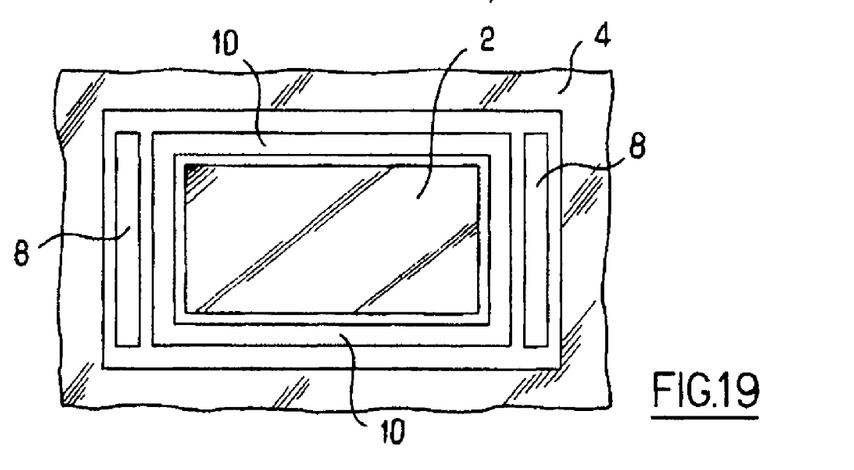

Finally, in the embodiment from FIG. 19, the windshield is attached to the bodywork by means of a continuous viscoelastic layer 10 forming a loop corresponding to the entire perimeter of the windshield. At the left and right lateral sides, an adhesive layer 8 is juxtaposed with the viscoelastic layer 10, so that this layer is also in contact with the bodywork and the windshield. A space is formed between the viscoelastic material layer and the adhesive layer. In order to ensure good acoustic performance, it will be anticipated that the modulus of the viscoelastic material is relatively low. This is why it will be possible to keep the two standard adhesive strips with a high elastic modulus greater than 20 MPa. During twisting of the body, it is the adhesive at the side struts that undergoes the highest loading level. This is the reason this arrangement is provided for placement of the adhesive. In summary, the complete loop of the viscoelastic material ensures the acoustic performance and sealing while the standard adhesive restricted to the two lateral sides ensures the mechanical strength.

Generally, before positioning the viscoelastic material, it will be advantageous to prepare the glass pane over the whole of its perimeter for bonding by application of a primer in a known way. The viscoelastic material is protected on one face by a nonstick protective strip and is wound onto itself being in the form of a roll. A device providing the role of a reel and of peeling off the protective strip is used to position the product onto the areas described above of the groove for bonding the glass pane and/or the bodywork. Squeezing of the viscoelastic material is provided at the same time as the positioning by the action of a pressure roller, the force of which will be tared as a function of the recommendations characteristic of the viscoelastic material. Typically, the adhesive is applied after the viscoelastic material.

If the viscoelastic material is not compatible with the glazing adhesive, it will be possible to provide, as previously mentioned, a foil, for example in the form of a PET material having a thickness of around 10 micrometers. This foil could be treated in order to have a good bondability with regards to the glazing adhesive. This treatment could be carried out by an adhesion primer such as, for example, BETAPRIME 5404 from Dow.

The adhesive for positioning the glazing is deposited over the whole bonding groove while respecting the total height specified, whether this is in the areas where the viscoelastic material is present or outside these areas. The adjustment of the amount of adhesive as a function of the area will be obtained by a variation in the speed of the bonding robot, for example.

The invention in its various embodiments makes it possible to reduce the amplitude of the vibrations of the windshield by introducing damping thanks to a particularly advantageous geometry and process and also an attachment that amplifies and concentrates the incident energy in order to better dissipate it. The adhesive corrects the manufacturing variations and the surface irregularities during the attachment.

Figure 13:
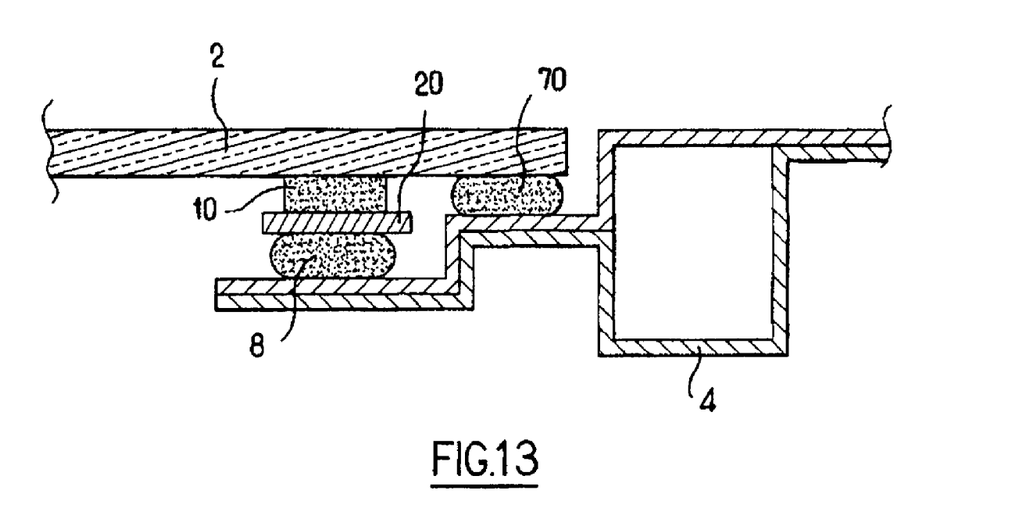
FIGS. 13 and 14 are similar views to FIG. 2 illustrating other embodiments.

It should be noted that in FIGS. 1 to 10, 12, 17 and 18, the viscoelastic layer, for example in the form of a strip adhering to the two faces, is in series with the adhesive layer. In FIGS. 19, 14 and 15, the viscoelastic layer is in parallel with the adhesive layer. In this case, the viscoelastic material is, for example, applied in the form of a paste to make it easier to compensate for the surface irregularities. In FIG. 13, application of the layers is a combination of application in series and in parallel.

Of course, it will be possible to introduce numerous modifications to the invention without going outside the scope thereof.

It could be anticipated, as illustrated in FIG. 13, that one layer of adhesive (or of viscoelastic material) 70 is juxtaposed with two superposed layers of adhesive 8 and of viscoelastic material 10, and this being at least in certain areas of the perimeter of the windshield.

The invention claimed is:

1. A vehicle, comprising:
   at least one glass pane;
   bodywork;
   at least one layer of viscoelastic material interposed between the glass pane and the bodywork, the viscoelastic material being in direct contact with the bodywork; and
   an adhesive layer interposed between the glass pane and the viscoelastic material, wherein the viscoelastic material is discontinuous around a perimeter of the at least one glass pane and the adhesive layer is continuous around the perimeter of the at least one glass pane.

2. The vehicle as claimed claim 1, wherein the viscoelastic material extends continuously along at least one side of the perimeter of the at least one glass pane.

3. The vehicle as claimed in claim 1, wherein the viscoelastic material extends discontinuously along at least one side of the perimeter of the at least one glass pane.

4. The vehicle as claimed in claim 1, wherein the perimeter of the at least one glass pane has at least one side that is free from the at least one layer of viscoelastic material.

5. The vehicle as claimed in claim 1, further comprising a film interposed between the adhesive layer and the at least one layer of viscoelastic material.

6. The vehicle as claimed in claim 1, wherein the viscoelastic material has the following characteristics:
   a loss factor greater than or equal to 0.7; and
   an elastic shear modulus less than or equal to 3 MPa,
   in a temperature range from 10 to 40° C. and under a vibration excitation between 20 and 500 Hz.

7. A process for attaching at least one glass pane to a vehicle bodywork, comprising:
   interposing a layer of viscoelastic material between the at least one glass pane and the vehicle bodywork, the viscoelastic material being in direct contact with the bodywork; and
   interposing an adhesive layer between the glass pane and the viscoelastic material,
   wherein the viscoelastic material is discontinuous around a perimeter of the at least one glass pane and the adhesive layer is continuous around the perimeter of the at least one glass pane.

8. The vehicle as claimed in claim 1, wherein a ratio of an elastic modulus of the adhesive to an elastic modulus of the at least one layer of viscoelastic material is greater than 5.

9. The vehicle as claimed in claim 1, wherein the at least one layer of viscoelastic material includes a portion that has a thickness that decreases linearly to an edge of the at least one layer of viscoelastic material to form the discontinuity.

* * * * *